June 19, 1934.    J. C. CONRAD    1,963,260
SEED COTTON CLEANING AND HULLING MACHINE
Filed March 10, 1930
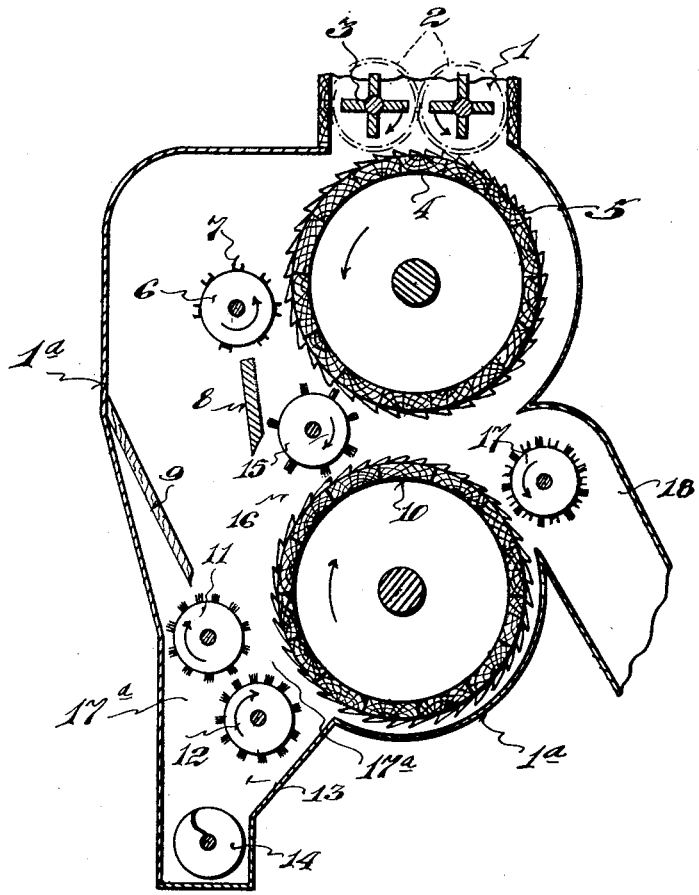
Joshua C. Conrad
INVENTOR.
ATTORNEY Patented June 19, 1934

1,963,260

UNITED STATES PATENT OFFICE 1,963,260

SEED COTTON CLEANING AND HULLING MACHINE

Joshua C. Conrad, Fort Worth, Tex., assignor to Continental Gin Company, a corporation of Delaware Application March 10, 1930, Serial No. 434,674

15 Claims. (Cl. 19—37)

This invention relates to a seed cotton cleaning and hulling machine suitable for use as a gin feeder, or wherever the hulling of bolly cotton is desired, and it is more particularly designed to be used upon cotton that has been passed through a boll breaking machine so as to have the bolls therein separated and broken up.

It has been the general practice, heretofore, to attempt to clean bolly cotton of the trash and dirt therein before the hulls were removed from the cotton. The present invention contemplates the removal of the hulls first, before attempting to clean the seed cotton of the major portion of the trash and dirt therein, which is considered a decidedly improved practice because of the fact that when the hulls themselves are left in the seed cotton they are a source of pin trash and shale.

According to this invention, having removed the hulls from the seed cotton, the latter may be then passed under beaters and over screens where the trash, shale and dirt can be easily and most effectively eliminated, and thus is provided a machine of great practical advantage to farmers of the western and northern cotton belt who have experienced great difficulty in hand picking their cotton so that a large percentage of it is gathered in the boll and they therefore require a cleaning machine which will effectively break and remove the bolls before attempting to complete the cleaning of the cotton or before it may be effectively fed into a gin.

In its broader aspect, my invention contemplates delivering the seed cotton with accompanying hulls, bolls and trash to an initial extracting mechanism where the hulls, bolls and major portion of the trash will be stripped and diverted away from the main cotton stream, provision being made for a secondary extracting mechanism disposed to receive the material stripped from the main cotton stream and to act thereon to collect the cotton that would otherwise go to waste with the hulls and trash and return it in a secondary stream which is combined with the main stream and passes therewith to the doffer.

In order that the main cotton stream shall be kept free of hulls and trash stripped therefrom, the stripping action occurs in such manner that the rejected material does not traverse the path of the main cotton stream as it approaches, or after it is engaged by, the initial extracting mechanism.

It is within the contemplation of my invention that the bolly cotton may receive a boll breaking and cleaning treatment before reaching the initial extracting mechanism, and may be subjected to further cleaning action after the combined cotton streams are doffed, such treatments being carried out in separate or incorporated mechanism, as may be desired, but as such mechanism forms no particular part of my invention, it is not disclosed herein.

The invention contemplates the passing of the cotton and hulls directly from the feed rollers to an initial saw cylinder which will carry the material downwardly with the cotton impaled on the saw teeth and the hulls carried loosely so that they can be knocked out by the upwardly moving teeth of a beater roll and again directed against the teeth of a lower saw cylinder to which the remaining seed cotton itself is delivered and by which it is carried away from the hull outlet and delivered to cleaners for the removal of the trash and dirt or directly to gins. This arrangement subjects the seed cotton to the action of the saw cylinders and two doffing brushes while the hulls, separated from the cotton impaled on the upper toothed saw cylinder, travel through a separate path and are stripped of any adhering cotton by the action of the lower or secondary saw cylinder which returns the seed cotton stripped from the hulls into the mass of seed cotton traveling towards the outlet.

The present invention contemplates any convenient or practical manner for the discharge of hulls from the machine and for the treatment of the seed cotton in its passage over the screens through which the dirt and trash is removed.

The invention further comprises the novel details of construction and arrangement of parts, which in their preferred embodiment only are illustrated in the accompanying drawing which forms a part of this specification, and which illustrates in transverse cross-section an apparatus for cleaning seed cotton in accordance with my present invention.

In the embodiment of the invention illustrated, the seed cotton full of bolls, dirt and trash is delivered to a feed chute 1 in any suitable manner and is there engaged by the feed rollers 2 which are driven in reverse directions by meshing gears 3 from any suitable source of power. The cotton is passed directly from the feed rollers 2 to the upper or primary saw cylinder 4, which may be of any suitable construction and driven in any suitable manner in a counter-clockwise direction so that the cotton, impaled on the teeth 5 of the saws, will be carried downwardly toward a stripper beater 6 having longitudinal channel irons 7 fastened thereon. This stripper beater, which rotates counter-clockwise, will act to knock the hulls in the direction of its rotation from the cotton impaled on the teeth of the saw cylinder 4 and will cause the hulls with any cotton adhering thereto, to be thrown over against the top of the casing and to pass down on the outside of the guard 8 for the saw cylinder 4 and doffing stripper 6 to the board 9 which will direct the hulls and any cotton thrown over therewith into contact with the saw teeth of the lower or secondary saw cylinder 10, which is driven in any suitable manner in a clockwise direction.

While I refer to the direction of rotation of parts as "clockwise" and "counter-clockwise", such terms are used merely as defining the operation of the apparatus shown, which provides for a right hand cotton discharge, it being understood that for a left hand discharge the parts would be reversely arranged and driven clockwise.

The greater portion of the hulls will pass downwardly through the clearance left between the board 9 and the saw cylinder 10 and will fall upon the brushes 11 and 12 which are driven by any suitable means in a clockwise direction and are so arranged that the bolls or hulls with cotton adhering thereto will be caught by one or the other of these brushes and carried over and delivered to the saw or toothed cylinder 10.

The clean hulls will pass between the brushes and between the brush 12 and saw cylinder 10 into a hull hopper 13 and be delivered to the screw conveyor 14 which will discharge them through an opening in the end wall of the cleaner. The cotton caught in the teeth of the saw cylinder 10 with any bolls or hulls adhering thereto is carried upwardly and is acted upon by the doffing brush 15 which is disposed to co-act with the teeth of both saw cylinders 4 and 10 and which is driven in a clockwise direction so that it will serve both to doff the seed cotton from the upper toothed saw cylinder 4 and to act as a stripper for the lower saw cylinder 10 which will throw the bolls and hull particles back against the board 9 until they are sufficiently cleaned to escape through the clearance 16 to the brushes 11 and 12. The seed cotton passing the combination doffing and stripping brush 15 will be carried forward by the teeth of the lower saw cylinder 10 toward a second doffing brush 17 which is driven counter-clockwise so that it will act to doff the seed cotton from the saw cylinder 10 and deliver it to a chute 18 through which it may be passed into any type of foraminous concaves and beater combinations for cleaning or directly to a gin. The casing generally designated by the numerals 1a can be as shown partly of metal and partly of wood and is continuous, enclosing all of the apparatus described in any suitable manner, leaving only the feed opening for the discharge of the material collected by the screw conveyor 14 and the discharge opening for the cleaned cotton delivered from the machine. Suitable doors may be provided for easy access to interior of the machine.

No attempt has been made herein to show in detail a drive for all of the rotating elements shown, but the arrows on each element indicate its direction of rotation and those who are skilled in the art will readily understand that these elements may all be driven in many different ways by one or more common or co-ordinated drives.

In practice, the stream of seed cotton carries downwardly past the stripper beater 6 on the toothed saw cylinder and will be doffed therefrom by the brush 15 and will there join the cotton on the saw cylinder 10 that passes the brush 15 acting as a stripper and the streams of cotton thus joined will be again doffed from the saw cylinder 10 by the brush 17 and delivered to suitable beaters and concaves, or to gins as the case may be. The bolls, with all cotton adhering thereto, that are knocked over by the stripper beater 6 will be acted on first by the saw cylinder 10 and the stripper brush 15 and will become partially stripped of the adhering hulls by the action of these agencies until the bolls and hulls are free to pass through the clearance 16 and to fall upon the brushes 11 and 12 which will catch the bolls or hulls having any appreciable amount of cotton adhering thereto and again deliver the same to the saw cylinder 10 which will carry them up until the hulls are again stripped by the brush 15 and the operation will be repeated until the hulls, stripped clean of all cotton, fall through the passages 17a to the screw conveyor 14 and are discharged. Thus it will be seen that the large mass of seed cotton comprising the main stream will be carried directly through the cleaner on the upper extracting saw while the hulls, trash and accompanying cotton stripped from the main stream will be presented again and again to the lower extracting saw, to make sure by these repeated engagements that the waste cotton tending to escape with the trash will be reclaimed and restored to the main cotton stream. The elements 9 and 11 coact to form the equivalent of a hull board adapted to present the material rejected by the initial extracting mechanism to the secondary extracting saw, and my invention contemplates the provision of any suitable means to cause the secondary extracting saw to again act on the hulls, trash and cotton escaping past the clearance between the saw cylinder 10 and the element 11, as in this manner practically all of the cotton that would otherwise go to waste with the hulls is recaptured. Much of the dirt and trash will be removed with hulls, whereupon any desirable cleaner arangement may receive and rid the cotton of the fine dirt and trash possibly remaining, as the final operation preparatory to ginning, or it may be passed directly to gins.

Though the invention has been described with great particularity, the details of the embodiment of the invention herein shown are not to be construed as being limited thereto, as changes in arrangement and substitution of equivalents may be made by those skilled in the art without departing from the invention as defined in the appended claims.

Having thus described my invention, what I claim as new and desire to secure by Letters Patent, is:—

1. In a bolly seed cotton hulling and cleaning machine, a casing, coacting feed rollers in the upper part of said casing, a saw cylinder arranged parallel with and under said co-acting feed rollers and driven in a counter-clockwise direction, a stripper roller arranged parallel to and on the down going side of said saw cylinder, said stripper roller being revoluble in the same direction as the saw cylinder and adapted to beat the hulls backwardly and upwardly from the seed cotton that is allowed to pass on said saw cylinder, a brush driven in a clockwise direction and arranged to doff said saw cylinder, a second saw cylinder arranged to rotate in a clockwise direction on an axis parallel with the axis of said first cylinder to impale material doffed from said first cylinder, means coacting with said second saw cylinder to effect a cleaning of seed cotton stripped from said first mentioned saw cylinder, and means to collect and carry off the hulls separated from the seed cotton by said agencies.

2. In a seed cotton hulling and cleaning machine, a casing having top feed rollers, a pair of superimposed spaced parallel saw cylinders oppositely rotatable in the casing, a hull stripping roller coacting with the down going side of the upper saw cylinder, a doffing stripper brush arranged to transfer to the lower saw cylinder from the upper saw cylinder seed cotton that has passed the stripper roller, a baffle plate adjacent said doffing stripping brush means to doff said lower saw cylinder, brushes operating below and to one side of said lower cylinder to collect and again discharge material for impalement by said lower cylinder.

3. In a cotton hulling cleaning machine, a casing, a pair of enmeshed feed rolls a pair of parallel saw cylinders arranged one above the other and rotating in opposite directions a brush arranged between the said saw cylinders and arranged to strip hulls from the lower of said saw cylinders which revolves upwardly toward said brush the said brush being further arranged to doff the upper of said saw cylinders which revolves downwardly toward said brush, the latter revolving in the same direction as the lower of said saw cylinders and a pair of brushes adjacent the upgoing side of said lower saw cylinder to effect impalement of material escaping the action of said lower saw cylinder.

4. In a seed cotton hulling and cleaning machine, a casing having a pair of co-acting feed rollers, a saw cylinder arranged to receive cotton and hulls from the said feed rollers, a stripper adapted to strip hulls from the seed cotton on the down going side of said saw cylinder, a saw cylinder arranged below the first mentioned saw cylinder and parallel to same, a doffing-stripper brush arranged between the said saw cylinders and adapted to brush seed cotton from the upper saw cylinder and to brush back hulls from the lower saw cylinder, a doffing brush arranged behind the lower saw cylinder and adapted to doff seed cotton from same, and a plurality of picker feeder rollers arranged at the lower front side of the same saw cylinder and spaced from same.

5. In a seed cotton hulling and cleaning machine, a casing, a pair of parallel engaging feed rollers in upper part of said casing, a saw cylinder parallel with and below the feed rollers, a stripper roller arranged parallel to said saw cylinder and on the down going side of same, a doffing-stripper brush arranged parallel to the lower down going side of said saw cylinder, a second saw cylinder arranged parallel under and partly back of said doffing-stripper brush, and rotating in an opposite direction with respect to said first cylinder, a doffing brush parallel and arranged on back side of said lower saw cylinder, and a pair of spaced rollers, one arranged between and parallel with the other and the said lower saw cylinder and placed in front of the lower front side of said lower saw cylinder.

6. In a cotton hulling and cleaning machine, a casing, a pair of inter-engaging co-acting feed rolls, a primary saw cylinder arranged below said rolls and rotating in a counter-clockwise direction, a stripper roller arranged on the down going side of and parallel with said saw cylinder, a secondary saw cylinder rotating in a clockwise direction, a combined doffing and stripper brush arranged between the primary and secondary saw cylinders and having the brush axis parallel with the saw cylinder axes, said brush being arranged at the lower front side of the upper saw cylinder and the upper front side of the lower saw cylinder, and a doffing brush arranged at back side of the lower saw cylinder and having its axes parallel with said saw cylinder axis.

7. In a machine for cleaning seed cotton, feed means for the seed cotton, a main extracting saw cylinder to which the seed cotton with accompanying hulls and trash is fed and which is rotated to carry same downwardly, a similarly rotatable stripper roller coacting with the downgoing side of said main saw cylinder below the feed of cotton thereto to divert from the main cotton stream thereon most of the hulls and trash and a part of the seed cotton, guide means to direct the hulls and trash in a separate stream away from the cotton being fed to said saw cylinder a secondary extracting saw cylinder arranged below the main saw cylinder and driven reversely thereto, guide means adapted to present to the upgoing side of said secondary saw cylinder the material stripped from the main saw cylinder for the recovery of cotton therefrom and disposed to permit hulls and trash to pass downwardly between same and said secondary saw cylinder, means to strip hulls and trash from the cotton stream carried upwardly by the said secondary saw cylinder, means to drive said cylinders to carry the cotton streams they bear in converging paths to the pass between said cylinders to cause the two streams of stripped cotton to combine on one of said saw cylinders, and means to doff said latter saw cylinder.

8. The combination with a cotton cleaning machine according to claim 7, of a rotatable element disposed in the path of the hulls and trash which escape past said guide means and having cotton engaging means thereon adapted to engage locks of cotton tending to escape with the hulls and trash and cause the return of same to said secondary saw cylinder.

9. A machine for cleaning seed cotton according to claim 7, in which the means to cause the two streams of cotton to combine acts to effect their combination while traversing the pass between said saw cylinders.

10. In a cotton cleaner, a casing having a cotton inlet, a cotton outlet and a hull outlet, an initial saw cylinder positioned to receive and entrain the entering stream of cotton and convey it toward the cotton outlet, means coacting with said initial saw cylinder to separate hulls and trash from said stream of cotton and direct same away from the entering cotton stream in a separate path toward the hull outlet, a secondary saw cylinder positioned and driven to treat the separated hull stream so as to collect therefrom and entrain cotton and convey it toward the cotton outlet, said cylinders being reversely driven in directions to carry their entrained cotton in the same direction through the pass between them, and means to doff said cotton.

11. In a cotton cleaner, a casing having a cotton inlet and separate outlets for the cleaned cotton and the hulls, an initial saw cylinder positioned to receive and entrain the entering stream of cotton and convey it downwardly and then toward the cotton outlet, means coacting with said saw to separate hulls and trash from the entrained cotton and divert same away from the entering cotton stream in a path separate therefrom toward the hull outlet, a secondary saw cylinder driven reversely to the initial saw cylinder and disposed in the path of the separated hull stream to collect therefrom any accompanying cotton and entrain it, said saw cylinders being driven in a direction to carry their entrained cotton streams into the pass between them, and means to doff said cotton and deliver same to the cotton outlet.

12. In an apparatus for removing hulls and trash from seed cotton and the like, an initial toothed element, means to present the entering cotton, hulls and trash to be entrained by said element, a secondary toothed element disposed in the path of hulls and trash diverted from the cotton on said initial toothed element and adapted to collect therefrom and entrain a stream of cotton that would otherwise go to waste, said elements being reversely driven in directions to cause the cotton streams entrained thereon to converge toward and become merged in the pass between the elements, and means to doff the combined cotton streams from the element carrying same.

13. An apparatus according to claim 12, in which a stripping means is disposed on the down-going side of the initial toothed element bearing the main cotton stream, and the secondary toothed element is disposed under the said initial element in position to present its up-going side to the escaping hulls and trash.

14. In a cotton cleaning machine, a pair of juxtaposed toothed cylinders and means to rotate them in opposite directions, means to present cotton to be cleaned in position to be engaged and entrained by one of said cylinders and carried thereby as a main cotton stream downwardly into the pass between said cylinders, means to strip hulls and trash with some accompanying cotton from said cotton stream and divert same from the path of the cotton forming said stream, hullboard means to present said diverted material to the other of said cylinders which is adapted to collect the cotton accompanying the escaping hulls and carry it upwardly as a secondary stream into said pass, agencies adapted to cause said streams to become merged while traversing said pass between said cylinders, and means to doff said merged streams.

15. In a cotton cleaning machine, a pair of toothed cylinders reversely driven, means to cause the cotton to be cleaned to be entrained by one of said cylinders, means to strip said cotton, means to keep the stripped material separated from the cotton approaching and entrained on said latter cylinder, a hullboard means to present said stripped material to the other cylinder, said cylinders being rotated to carry their respective cotton streams in the same directions into the pass between them, means to merge said streams on one cylinder, and means to doff said latter cylinder.

JOSHUA C. CONRAD.